United States Patent Office 3,780,161
Patented Dec. 18, 1973

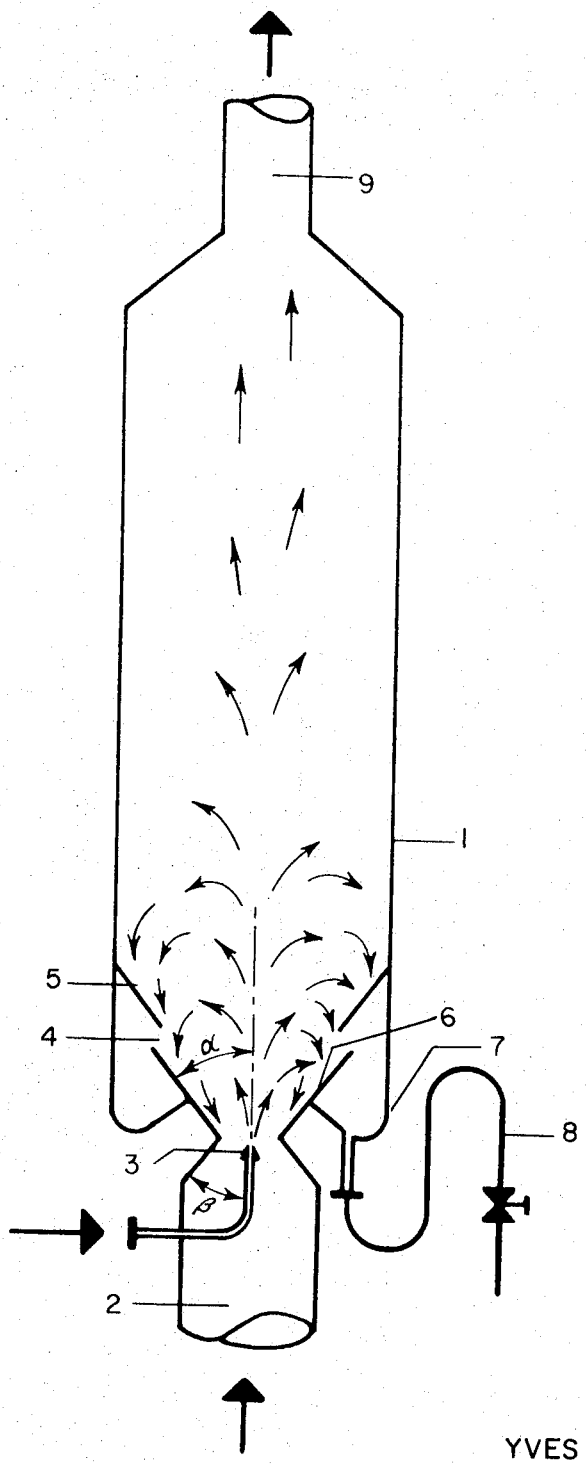

3,780,161
PROCESS FOR CONCENTRATING SOLUTIONS
Yves Berquin, Paris, Pierre Duval, Grand Couronne, and Jean-Claude Alleton, Rouen, France, assignors to Azote et Produits Chimiques, Toulouse, France
Filed Feb. 2, 1971, Ser. No. 111,887
Claims priority, application France, Feb. 2, 1970, 7003465; June 26, 1970, 7023714
Int. Cl. C01b 15/16, 25/16, 25/26
U.S. Cl. 423—310                                    11 Claims

ABSTRACT OF THE DISCLOSURE

To concentrate solutions such as phosphoric acid, droplets thereof are entrained in a high velocity ascending current of hot gas such as flue gas, air, etc., optionally containing a reactant gas such as ammonia. The entrained droplets are passed to a decelerating zone where the velocity profile of the gas is such that continuous circulation of droplets is possible, with droplets proximate the axis of said zone being entrained upwardly and droplets proximate the side of said zone falling downwardly where they can be re-entrained by entering hot gas. In this manner it is possible to recirculate the droplets and control the extent of concentration within a reasonably dimensioned apparatus and without any difficult separation problem because of excessively small droplets.

BACKGROUND OF THE INVENTION

This invention relates to a process and apparatus for concentrating solutions by direct contact with hot gases, and in particular, wherein a stream of solution is dispersed into droplets by an ascending gaseous current.

It is already known that a solution-to-be-concentrated can be dispersed by a hot gaseous current. The dispersion is conducted at the bottom of a conical enclosure so that the resultant droplets of solution are carried upwardly in the conical enclosure, forming a more or less fluidized bed. The heated droplets and the cooled gaseous current are collected at the top of the enclosure, and are then separated in a suitable device at the top of the enclosure.

In order to carry the droplets of solution upwardly, the gas must have a high velocity; consequently, unless the enclosure is extraordinarily long, contact times for practical purposes are limited to values ranging about one second. So that the evaporation is sufficient in a so short space of time, either there must be employed a gas having a very high temperature or the solution must be atomized into very finely divided droplets. However, both of these alternatives have substantial disadvantages. On the one hand, the use of a very high temperature gas entails risks of volatilizing or altering the dissolved substance; moreover, the walls of the enclosure become overheated, thereby increasing the rate of corrosion and the formation of deposits. On the other hand, if the solution is atomized into very fine droplets, they become very difficult to separate from the carrier gas.

SUMMARY OF THE INVENTION

A main object of this invention is to provide a process and apparatus for concentrating a solution by dispersing same into droplets in an upward current of hot gas which process is improved by providing a sufficiently long contact time between the solution and the carrier gas so as to avoid the disadvantages due to excessively high gas temperatures or to very finely divided droplets.

Another object is to provide process control and apparatus for regulating the contact time according to the composition of the treated solution and the final desired concentration.

Upon further study of the specification and appended claims, other objects and advantages of the present invention will become apparent.

To attain these objects, the solution to be concentrated is injected into an enclosure comprising a lower substantially conical zone and an upper tubular zone. The conical zone is inverted insofar as its apex is at the bottom. Said solution is then dispersed into droplets by a hot current of gas flowing upwardly through the enclosure past the point of injection of the solution. Droplets suspended in said current of gas are continuously circulated as they rise through the enclosure, predominantly in the conical zone, in a direction upwardly and outwardly from the central zone of the enclosure towards the walls of the enclosure where a portion of said droplets can be recirculated by the ascending current of gas.

The cencentrated solution is withdrawn from the lower zone of the enclosure, for example, by one or several openings located in the conical zone and the tubular zone. Resultant cooled gas is withdrawn from the upper part of the enclosure.

According to the process of this invention, the droplets of solution to be concentrated are dispersed proximate the apex of the conical zone of the enclosure and are carried upwardly along the axis of the enclosure where the velocity of the gaseous current is the highest.

The velocity profile in inverted conical zones provides that the gaseous stream along the walls of the cone has the lowest velocity, and that as the gas stream rises through the conical zone, the average velocity also decreases. Accordingly, as the entrained droplets rise through the conical zone, they reach a point where their weight exceeds the lifting effect of the gas and they more or less, metaphorically, slide down the velocity profile towards the walls. Unwithdrawn droplets then fall to the apex of the conical zone where they are again lifted by the gaseous current. This flow of droplets is tantamount to internal recycling, and permits an increased contact time between the solution and the hot gas, thereby resulting in more concentrated solutions. Furthermore, by regulating the rate of withdrawal, the extent of the internal recycling can be controlled, and therefore the contact time between the solution and the hot gas.

For the record, this type of circulation has been known for many years in connection with the treatment of solid particles. For example, it is often called a "spouted bed," and is used and described in U.S. Pats. 2,786,280 of Gishler and Al. and 3,231,413 of Y. F. Berquin. However, it is readily apparent that these disclosures relating to the treatemnt of solid particles do not teach that the same type of circulation can be obtained with droplets, much less is there the slightest suggestion that there can be obtained an improvement in liquid concentration processes.

Thus, the present invention is based on the discovery that it is possible to obtain a spouted bed with droplets and that this type of bed can be used beneficially for the concentration of solutions.

BRIEF DESCRIPTION OF THE DRAWING

The attached drawing is a schematic illustration of preferred apparatus used to practice this invention.

DETAILED DISCUSSION OF THE INVENTION

The upward current maintaining the particles in suspension and circulation can be an inert gas. Thereby, it is possible to concentrate a wide variety of solutions, e.g., aqueous solutions of solid products such as salts, sugars, etc., or liquid products such as phosphoric acid, etc., as well as solutions of solids or liquids in organic solvents, e.g. alcohols, chlorinated solvents, pyridine, ketones, etc.

According to another embodiment of the process of the invention, the upward current can contain a gas capable of reacting with the injected solution. Owing to the excellent contact between the droplets of solution and the gaseous current maintaining them in suspension and circulation, the absorption of the reactive gas is very fast and practically complete. In this case, the gaseous current is simultaneously useful for conducting the reaction and for concentrating the resultant solution.

This latter embodiment of the invention is particularly advantageous when the reaction between the gas and the injected solution is exothermic because heat liberated during the reaction is used for the evaporation of the solvent. A significant saving of thermal values is thus realized. For instance, when phosphoric acid is neutralized by ammonia to form monoammonium phosphate, the saving of thermal energy can reach as high as 50%. Moreover, it is possible to lower the temperature level of the hot gases introduced into the apparatus, thereby mitigating problems associated with the materials of construction.

The gaseous reactant is introduced into the current of hot gas either before the latter becomes in contact with the droplets of solution or just when it comes into contact with them. For practical purposes, it is preferred to introduce a quantity of gaseous reactant which is somewhat less, e.g., 60 to 95%, than the stoichiometric quantity necessary for the reaction in order to avoid the losses due to slight irregularities in the relative flow of reactive gas and solution or in the concentration of the treated solution, for instance. The reaction is then completed in a vessel downstream of the concentration step.

It is to be appreciated that this invention is useful for all types of liquid-gas reactions. The gaseous reactant can be, for instance, ammonia when phosphoric acid, or another acid, is treated, thereby resulting in a concentrated solution of ammonium phosphate or of another ammonium salt. Other examples of gaseous reactants include, but are not limited to, carbon dioxide, HCl and $SO_2$.

As usual in spouted beds, irrespective of the chemical nature of the entraining or reactant gas there are several interrelated variables which must be controlled in order to obtain the desired circulation. These variables are the density of the liquid, size of droplets, velocity of gas at the point of injection of the liquid, the diameter and height of the bed.

However, the most critical variable is the rate of decrease of the average velocity with respect to height which occurs in the conical zone. This variable is regulated by the vertex angle of a substantially conical zone, and in our experimentation conducted with specific systems, we have discovered that when treating solutions this angle must be higher than 30° in order that the circulation of the droplets in the bed is obtained. It is preferably between 40 and 70°. The velocity of the gaseous current is generally ranging from 80 to 120 m./s. depending on the density of the solution treated. In the case of aqueous solutions with density of about 1 to 1.8, it is generally about 95 to 100 m./s. It is higher for more dense solutions and lower for less dense solutions.

DESCRIPTION OF DRAWING

The attached drawing depicts preferred apparatus for conducting the process of the invention. This apparatus comprises an enclosure 1 formed of a conical lower part and a cylindrical upper part.

The vertex angle $\alpha$ of the conical part is higher than 30°, preferably between 40° and 70°. It has been observed that, within these limits, the continuous movement of circulation of the solution to be concentrated was obtained.

The feed pipe for the gas 2 can be cylindrical but it is preferred to employ a pipe, the upper part of which is conical and which is fixed coaxially to the small base of the conical part of the enclosure in order to form a convergent-divergent apparatus as shown in the attached figure. This apparatus provides means to accelerate the gas when it enters the enclosure. The velocity of the gaseous current when it enters the enclosure ranges from 80 to 120 m./s. In the case of aqueous solutions, it is generally about 100 m./s.

The solution to be concentrated is introduced by a nozzle 3 extending in the neck formed of the junction of the apex portion of the frusto-conical part and the feed pipe for the gas. This nozzle is preferably equipped with means facilitating the formation of droplets; however, in some cases, the kinetic energy of the current of hot gas can be sufficient to satisfactorily break up the spout of the liquid overflowing the nozzle 3 into the desired droplet particle size. If not, specific embodiments of nozzle attachments for accomplishing this task are described in Chemical Engineer's Handbook by John H. Perry, 3rd edition page 1171 to 1174.

The concentrated solution is drawn off through one or more holes 4 in the conical part of the enclosure or at the junction between the conical part and the cylindrical part. These openings can be simple holes opened in the wall. In this case, there are collected on the one hand, a portion of solution flowing along the conical wall of the enclosure and, on the other hand, a portion of solution carried by the gaseous jet penetrating the hole. Preferably, these holes are fitted with deflectors so disposed that the solution flowing along the walls in the conical part pass over the hole without penetrating it.

According to a preferred embodiment, the conical part is formed of several plates, preferably two, overlapping and spaced from one another. The attached figure depicts an example of this embodiment. The conical part is formed of a plate forming a baffle 5 welded to the cylindrical part, and of a plate 6 fixed to the feed pipe for the gas 2. The arrangement of the plate forming baffle 5 and of the plate 6 are slightly set off out of line in order to adjust the opening 4. On another hand, the plate forming baffle 5 overlaps the plate 6 in order that the solution overflowing along the plate forming baffle falls on the plate 6 without falling through the hole 4. When the holes have deflectors or are formed of overlapping plates, the only liquid collected is the solution carried by the portion of the gaseous current penetrating the hole. Regulation of solution withdrawal is thus facilitated. The concentrated solution is collected in a ring channel 7 fixed to the conical part of the enclosure below the holes. The withdrawal of the concentrated solution is made by a siphon-shaped pipe 8. The control of the rate of withdrawal is made either by adjusting the height of the upper end of the siphon, or by the regulating a valved tap fitted to this pipe. In the latter case, the rate of recycling can be controlled by regulating the valve. Thus, concentrated solution can be accumulated in the channel 7 until it overflows into the holes 4 of the enclosure 1 where it is then recirculated.

The cooled gas containing vaporized solvent is withdrawn though duct 9 at the upper part of the enclosure. It is then fed to a conventional separator, not shown, for instance, of the cyclone or impingement type, where the small droplets of liquid are freed from the gas. The small quantity of solution extracted from this separator can, if desired, be recycled to fresh solution entering the apparatus, or added to the withdrawn concentrated solution.

The separator can then be followed by a refrigerated condenser for recovering evaporated solvent.

In some cases, to improve the thermal balance, it can be advantageous to employ several apparatuses of the described type connected in series and disposed one above the other. The dilute solution to be treated is introduced in the highest apparatus and the concentrated solution withdrawn from this apparatus is introduced into the bottom part of the next lower apparatus. The concentrated solution withdrawn from this second apparatus is likewise passed to the next lower apparatus as feed, and so on. The final solution is therefore drawn off the lowest apparatus. The hot gas introduced in the lowest apparatus passes upwardly through all the concentrators, and if desired, between two apparatuses a further quantity of hot gas can be introduced to reheat and to reaccelerate the gas introduced in an upper apparatus.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

This example was conducted in an apparatus similar to that shown in the attached drawing. Dimension-wise, the cylindrical part of the enclosure 1 has a diameter of 310 mm. and a height of 2 m. The vertex angle $\alpha$ of the inverted bottom conical portion of the enclosure is 60°. The feed pipe 2 terminates at its upper end in a frusto-conical shape having a vertex angle $\beta$ of 40°. The lower point of the enclosure 1 joins the feed pipe to form substantially a venturi throat, the diameter being 70 mm.

Through the pipe 3, wet process phosphoric acid containing 30% of $P_2O_5$ is injected into the venturi throat at a rate of 160 l./h. at ambient temperature. To evaporate this liquid there is passed 800 m.$^3$/h. of gas at 540° C. through pipe 2. There is thus withdrawn phosphoric acid concentrated to 52.5% $P_2O_5$ having a temperature of 85° C. The gases leave the apparatus at a temperature of 95° C. The output in $P_2O_5$ is 99%.

EXAMPLE 2

There is employed the same apparatus as described in Example 1 except that the vertex angle $\alpha$ of the conical portion is 55°. Phosphoric acid containing 30% $P_2O_5$ is injected at ambient temperature at a rate of 50 l./h. into a current of gas having a temperature of 350° C. and a flow rate of 800 m.$^3$/h. (calculated at normal pressure and temperature). Phosphoric acid having a concentration of 69.8% $P_2O_5$ and a temperature of 120° C. is withdrawn, and the gases leaving the apparatus have a temperature of 160° C.

EXAMPLE 3

Employing the same apparatus as in Example 1, there is concentrated a solution of phosphate and ammonium nitrate containing 6.07% ammoniacal nitrogen, 5.53% nitric nitrogen and 8.55% $P_2O_5$. This solution is injected at ambient temperature at a rate of 72 l./h. and a current of gas is introduced at a rate of 800 m.$^3$/h. at a temperature of 125° C. There is thus obtained a concentrated solution having a temperature of 42° C., containing 14.55% $P_2O_5$, 9.90% ammoniacal nitrogen and 9.40% nitric nitrogen. The exit gases have a temperature of 44° C.

EXAMPLE 4

Again employing the apparatus described in Example 1, the feed liquid and gas respectively are 160 l./h. of phosphoric acid at 30%, and 800 m.$^3$/h. of gas at 400° C. to which are added 8 kg./h. (10 m.$^3$/h.) of gaseous ammonia at 20° C. There is withdrawn a concentrated solution containing 4.3% nitrogen and 50% $P_2O_5$.

EXAMPLE 5

With the same apparatus of Example 1 being used, phosphoric acid (30% $P_2O_5$) is introduced at a rate of 120 l./h. The hot gases at 300° C. are introduced at a rate of 500 m.$^3$/h. (rate calculated at normal pressure and temperature) with 18 kg./h. of ammonia being added. The temperature of the exit gases is 220° C. and the temperature of the withdrawn product is 175° C. The latter product, containing 13.5% nitrogen and 52% $P_2O_5$, is fluid at 175° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

For example, whereas the apparatus shown in the drawing provides excellent operation, it is evident that modified inverted frusto-conical shapes can be employed while still obtaining the desired circulation of dispersed droplets. Accordingly, the expression "substantially frusto-conical" is intended to embrace all such possibilities.

What is claimed is:

1. A process of concentrating a solution, said process comprising passing said solution through a nozzle to form droplets, and entraining said droplets of said solution in a high velocity ascending current of hot gas, passing resultant gas containing said droplets through an enclosure comprising a vertically disposed, inverted substantially frusto-conical zone having a vertex angle higher than 30°, and a tubular zone joined to and above said frusto-conical zone, said enclosure having a lateral opening disposed in the frusto-conical portion of said enclosure or at the junction between the inverted substantially frusto-conical zone and the upper tubular zone, establishing in said zone a continuous predominant spouted bed circulation of dispersed droplets such that droplets proximate the axis of said zone pass upwardly and droplets at the sides of said zone pass downwardly along the sides of said zone in said high velocity ascending current of hot gas; withdrawing through said lateral opening a portion of resultant heated droplets and collecting same in a channel zone surrounding and below said lateral opening; withdrawn resultant liquid from said channel zone at a rate sufficient to regulate the extent of recirculation of said dispersed droplets; and withdrawing resultant cooled gas containing evaporated vapor from the top of said frusto-conical enclosure through said upper tubular portion of said enclosure.

2. A process according to claim 1 wherein said solution is phosphoric acid.

3. A process according to claim 2 wherein said ascending current of hot gas contains ammonia in a quantity of 60–95% of the stoichiometric quantity necessary to form mono-ammonium phosphate.

4. A process as defined by claim 1, said frusto-conical portion having a vertex angle of 40–70°.

5. A process as defined by claim 1, the hot ascending gas passing through a convergent-divergent, venturi-like configuration as it passes into said frusto-conical zone to entrain said droplets.

6. A process as defined by claim 1, said frusto-conical portion comprising a baffle plate fixed to the tubular portion of the enclosure and a conical plate fixed to the pipe means for passing gas into the enclosure, said plates being offset from one another to form said lateral opening therebetween, said baffle slightly overlapping the conical plate.

7. A process as defined by claim 1, said velocity of hot gas being 80 to 120 meters per second.

8. A process as defined by claim 1, said solution being aqueous and having a specific gravity of 1 to 1.8, and said velocity of said hot gas being about 95 to 100 meters per second.

9. A process as defined by claim 1 wherein said droplets are liquid droplets.

10. A process as defined by claim 1 wherein the process is conducted in the absence of particulate solids.

11. A process as defined by claim 1 wherein the ascending current of hot gas is the only gas entering said enclosure.

References Cited

UNITED STATES PATENTS

| | | | |
|---|---|---|---|
| 654,290 | 7/1900 | Stebbias | 209—141 |
| 2,786,280 | 3/1957 | Gisher | 34—10 |
| 3,231,413 | 1/1966 | Berquin | 159—4 E |
| 3,474,849 | 10/1969 | Inchausti | 159—4 E |
| 2,051,029 | 8/1936 | Curtis | 23—107 |
| 3,527,562 | 9/1970 | Olper | 23—165 |
| 3,402,997 | 9/1968 | Mustian | 23—165 |

FOREIGN PATENTS

| | | | |
|---|---|---|---|
| 383,278 | 10/1932 | Great Britain | 23—107 |

OSCAR R. VERTIZ, Primary Examiner

G. A. HELLER, Assistant Examiner

U.S. Cl. X.R.

159—4 E; 423—317